(12) United States Patent
Pascoli et al.

(10) Patent No.: US 9,470,175 B2
(45) Date of Patent: Oct. 18, 2016

(54) INTERNAL COMBUSTION ENGINE POWER OUTPUT CONTROL IN RESPONSE TO AN ANOMALOUS RUNNING CONDITION

(75) Inventors: Alessandro Pascoli, Mestre (IT); Enrico Eger, Mussolente (IT)

(73) Assignee: Athena S.P.A., Alonte (VI) (IT)

( * ) Notice: Subject to any disclaimer, the term of this patent is extended or adjusted under 35 U.S.C. 154(b) by 617 days.

(21) Appl. No.: 13/981,297

(22) PCT Filed: Feb. 9, 2012

(86) PCT No.: PCT/IB2012/000228
§ 371 (c)(1),
(2), (4) Date: Jul. 23, 2013

(87) PCT Pub. No.: WO2012/107829
PCT Pub. Date: Aug. 16, 2012

(65) Prior Publication Data
US 2013/0304354 A1    Nov. 14, 2013

(30) Foreign Application Priority Data
Feb. 10, 2011    (IT) .............. VI2011A0022

(51) Int. Cl.
| F02D 41/00 | (2006.01) |
| F02D 45/00 | (2006.01) |
| G01P 15/16 | (2013.01) |
| F02D 41/10 | (2006.01) |
| F02D 41/14 | (2006.01) |
| F02P 5/15 | (2006.01) |
| F02P 9/00 | (2006.01) |
| F02D 37/02 | (2006.01) |

(52) U.S. Cl.
CPC ............... *F02D 45/00* (2013.01); *F02D 41/10* (2013.01); *F02D 41/1497* (2013.01); *F02P 5/1504* (2013.01); *F02P 9/005* (2013.01); *G01P 15/165* (2013.01); *B60W 2510/0652* (2013.01); *F02D 37/02* (2013.01); *F02D 2200/1012* (2013.01); *F02D 2250/18* (2013.01); *Y02T 10/46* (2013.01)

(58) Field of Classification Search
CPC .................................................. G01P 15/165
USPC ........................... 701/84, 85, 86; 73/114.28
See application file for complete search history.

(56) References Cited

U.S. PATENT DOCUMENTS

| 4,495,920 A * | 1/1985 | Matsumura | ......... F02D 41/0085 |
| | | | 123/480 |
| 4,635,201 A | 1/1987 | Izumi | |

(Continued)

OTHER PUBLICATIONS

International Search Report and Written Opinion dated Jul. 20, 2012, issued in PCT Application No. PCT/IB2012/000228, filed Feb. 9, 2012.

*Primary Examiner* — Hieu T Vo
*Assistant Examiner* — Arnold Castro
(74) *Attorney, Agent, or Firm* — Workman Nydegger (57) ABSTRACT

A method for regulating the power delivered by a reciprocating engine includes the definition of the value of a constant time interval T1 and the values of a threshold for the engine rpm and of a threshold for the percentage opening of the engine throttle valve, below which an operating area is defined in the Cartesian graph xy whose axes represent the engine rpm and the percentage opening of the throttle valve TPS. The method also includes: measuring, for each engine cycle, the value of the engine RPM at the level of an angular position of the crankshaft in a specific stroke (IS, PS); calculating, at the final instant (A) of each time interval T1, an activation value X* obtained from a comparison between the last RPM value measured before the final instant (A) and the last RPM value measured before the initial instant (B) of the time interval T1.

16 Claims, 3 Drawing Sheets

(56) References Cited

U.S. PATENT DOCUMENTS

| | | | |
|---|---|---|---|
| 4,776,311 A | 10/1988 | Venieres et al. | |
| 5,222,022 A * | 6/1993 | Adams | F02D 31/007 123/352 |
| 5,305,220 A | 4/1994 | Schoggl | |
| 5,916,295 A * | 6/1999 | Colvin | F02D 41/0097 73/114.24 |
| 6,577,944 B1 | 6/2003 | Davis | |
| 2009/0228183 A1 | 9/2009 | Watabe et al. | |
| 2012/0253626 A1* | 10/2012 | Yamaguchi | B60K 28/16 701/85 |

* cited by examiner

INTERNAL COMBUSTION ENGINE POWER OUTPUT CONTROL IN RESPONSE TO AN ANOMALOUS RUNNING CONDITION

BACKGROUND OF THE INVENTION

1. Field of the Invention

The present invention concerns a method for regulating the power delivered by a reciprocating, two-stroke or four-stroke, single-cylinder or multi-cylinder engine in response to an anomalous event that may occur in a device controlled by the same engine.

The above mentioned method for regulating the power delivered by an engine is preferably implemented on two- or four-wheel vehicles and is activated in response to an anomalous event that occurs while such vehicles are running. The invention also concerns a computer program suited to be loaded in the memory of an electronic processing device and suited to carry out the operating stages of the above mentioned method.

Finally, the invention also concerns an electronic unit for vehicles, preferably for motorcycles, which allows the computer program mentioned above to be executed.

2. Present State of the Art

It is known that in the last few years traction control systems, also called anti slip control systems have been developed and widespread that are used for cars and motorcycles, especially at a competition level.

These systems prevent the driving wheels from slipping and therefore they prevent the vehicle from skidding.

These electronically managed systems comprise an electronic unit connected to a plurality of sensor devices, each one of which is arranged at the level of a wheel, in such a way as to measure the number of revolutions the same wheel performs in a given interval of time. In this way the traction control system makes it possible to constantly monitor the running conditions of the motor vehicle and intervene accordingly.

In fact, if no anomalous situation occurs while the vehicle is running the electronic unit does not intervene, while when an anomalous situation is detected, for example if the wheels slip excessively, in which case the number of revolutions measured for at least one wheel differs from the number of revolutions of the other wheels, the same electronic unit intervenes and decreases the engine power until normal running conditions are restored.

In this case, when the tyre grip returns to normal, the electronic unit stops reducing the engine power.

Regarding motorcycles, the traction control systems of the known art mainly intervene on the ignition, stopping one or more cylinders, if the engine is provided with more than one cylinder and if necessary, or delaying ignition, or reducing the opening of the throttle valve when the system is provided with an electric throttle actuator.

In this way, the above mentioned traction control in critical conditions, like rain or ice, makes it possible for the rider to avoid losing control of the motorcycle. As already mentioned, this system is used even during competitions, thus making it possible to always grant perfect grip of the wheels on the ground, with no need for the rider to manage the acceleration phase manually so as to avoid anomalous situations, like for example slipping of the wheels and consequent skidding of the vehicle.

This system, however, poses two important drawbacks.

The first recognized drawback is due to the structural composition of the traction control systems of the known art, in particular to the number of components that make them up, meaning the electronic unit and, in the case of a motorcycle, at least two sensors for measuring the number of revolutions of the wheels, each one of which must be arranged, in fact, at the height of one of the wheels.

To disadvantage, said configuration of the traction control system of the known art makes the installation stage difficult to carry out, as the operator in charge with the assembly must position and install each sensor at the height of a wheel and wire various electrical leads from the sensors to the electronic unit that is usually located near the engine.

Consequently, the above mentioned installation stage is rather complicated and requires considerable time.

A second recognized drawback lies in that the traction control systems of the known art once they have detected an anomalous situation and intervened in order to reduce the engine power, do not take into account any changes in the driving conditions required by the rider while the vehicle is running, for example the need for more power controlled through acceleration.

This fact has negative consequences, for example, in the field of motocross competitions, when during jumps riders tend to use the accelerator to balance the weight of the motorcycle in the air.

In particular, when the motorcycle flies during a jump, it is highly probable that its two wheels tend to turn at different speeds.

In this case, if the motorcycle were provided with a traction control system, this would disadvantageously detect said difference in the wheel turning speed as an anomalous situation and, according to the operating principle described above, would operate so as to reduce the engine power and restore normal conditions.

However, the operation of the traction control system would prevent the rider from manually controlling acceleration to stabilize the motorcycle during the jump and prepare it for correct landing.

Said inconvenience would disadvantageously cause the rider to fall down when the motorcycle comes into contact with the ground.

SUMMARY OF THE INVENTION

The present invention aims to overcome the drawbacks listed above.

In particular, it is the object of the present invention to provide a method for regulating the power delivered by an engine in response to an anomalous event, suited to manage monitoring of anomalous situations and to decide if it is necessary to intervene or not according to data and information already available in the engines, as the number of engine rpm and the position of the throttle valve.

Consequently, it is the object of the present invention to provide an electronic processing device, in particular an electronic unit preferably for motorcycles, suited to manage the process for regulating the power delivered by the engine, including as an input data and information already available and used for other types of control performed on the same engine.

Thus, the electronic unit of the invention performs a check in a completely different way compared to the electronic units of the known art that require, as already explained, specific information regarding the rotation of the wheels obtainable through sensor devices arranged and installed on the wheels for this purpose.

It is a further object of the present invention to provide a method for regulating the engine power that in addition to checking and minimizing, if not even eliminating, anomalous situations occurring while a vehicle is running, can gradually adapt also to the rider's driving needs.

The objects described above are achieved by the method for regulating the power delivered by an engine according to the main claim.

In particular, the method for regulating the power delivered by an engine described in the independent claim 1 is characterized in that it includes a stage in which, for each engine cycle, the value of the engine RPM is measured at the level of a predefined angular position of the crankshaft in a specific stroke of the engine cycle.

During the operation of the engine, said angular position is maintained constant for all engine cycles.

Furthermore, the method of the invention includes a further stage consisting in the calculation and verification of an activation value.

Said stage is carried out at the final instant of each time interval T1 having a predefined and constant value and belonging to a plurality of time intervals T1 that follow each other while the engine is running.

In particular, the value of the time interval T1 is selected based on the type of anomalous event to be detected. For example, in the case where the anomalous event to be detected is the slipping of a vehicle's wheels, the value of the time interval T1 is preferably selected within an interval included between 2 and 250 ms.

Said activation value is obtained, in particular, from the comparison between the last value of the engine RPM measured before the final instant of T1 and the last value of the engine RPM measured before the initial instant of the same time interval T1.

The combined performance, by the method of the invention, of the two above mentioned operating stages makes it possible to obtain several advantages that are illustrated here below.

First of all, the two stages are independent of each other, meaning that the calculation and check of the activation value are carried out for each time interval T1, independently of the number of engine rpm and thus independently of the number of engine cycles that succeed one another in the unit of time.

This makes it possible to detect the presence of an anomalous event by exploiting only the last engine rpm value measured before the beginning of said time interval T1 and the last value measured before the end of the same time interval, independently of what happens between said two measurements. In fact, using the method of the invention, as previously explained, it is sufficient to select a suitable value for the time interval T1 in order to be able to detect an anomalous event with no error.

Therefore, there is no need to process the values of the engine rpm measured at each engine cycle through complex and time-consuming calculation algorithms, as is the case with the known techniques, in order to discriminate the rpm variations due to the occurrence of an actual anomalous event from the rpm variations caused by a simple speed change or by intrinsic noise generated during normal operation of the above mentioned engine.

Furthermore, thanks to the fact that the number of engine rpm is measured at a constant angular position in a specific engine stroke, per each engine cycle, it is not indispensable, in turn, to carry out further filtering operations or complex calculations with the measured RPM values. In fact, it is known that even during a single engine cycle the value of the engine rpm read can vary depending on the angular position chosen for the measurement and, with the same angular position, in the case for example of four-stroke engines, depending on the specific engine stroke selected for the measurement. Thus, contrary to the method of the invention, the known techniques, in order to be able to properly compare the values of the engine rpm measured during the various engine cycles, include the execution of statistic calculations with the measured RPM values, in such a way as to homogenize the possible variations found.

A further advantage of the method of the invention, which is a consequence of what has been illustrated above, lies in that the presence of an anomalous event is detected almost instantaneously and independently of the engine speed.

Said measurement, in the worst case, takes place after an entire time interval T1.

Regarding the check operation, first of all it consists in verifying whether the calculated activation value differs from zero.

Furthermore, according to the method of the invention, an operating area is defined in the Cartesian graph by whose axes represent the value of the engine rpm and of the percentage opening of the throttle valve TPS. Said operating area is delimited at the top by two predefined thresholds respectively for the number of engine rpm and for the percentage opening of the throttle valve.

The checking operation thus utilizes said operating area to evaluate, in the case where the activation value differs from zero, if the last value of the engine rpm and the last value of the percentage opening of the throttle valve, measured before said final instant of the time interval T1, fall within said area. Only in this last case the method will activate the reduction of the engine power by a percentage that is directly proportional to said activation value.

In fact, according to a preferred embodiment of the invention, in the case where the activation value is different from zero, but at least one of said two RPM and TPS values is outside said operating area, the method interrupts the reduction of the engine power, if active, by continuously reducing the activation value until it reaches zero in an entire predefined time interval T2. During said reduction of the activation value, also the reduction percentage defined for the engine power is in turn reduced, in proportion to said activation value.

In this way, if during the engine power reduction more power is needed, for is example when the rider accelerates, the method of the invention takes into account said need, but supplies the required power gradually.

Advantageously, this operating procedure prevents all the required power from being supplied instantaneously, for example when the rider accelerates at the end of a turn while the engine power reduction is active.

In fact, if said required power were supplied instantaneously, the motorcycle would probably revolve on itself, causing the rider to fall down.

Further characteristics of the method for regulating the power, of the computer program suited to execute the stages of the above mentioned method and of the electronic unit preferably for motorcycles that allows the method of the invention to be implemented are described in the dependent claims.

As a consequence of the fact that the method of the invention, in order to be able to monitor any anomalous events that may occur while the vehicle is running, exploits information that is already available and used for the management of the engine, and, therefore, thanks to the fact that the electronic unit does not need additional inputs for connection to dedicated sensor devices, the invention offers the advantage that the installation of said electronic unit can be carried out in a much simpler and quicker way compared to the systems of the known art.

BRIEF DESCRIPTION OF THE DRAWINGS

The objects and advantages described above will be highlighted in greater detail in the description of a preferred embodiment of the invention that is provided as an indicative, non-limiting example, with reference to the enclosed drawings, wherein.

DETAILED DESCRIPTION OF THE PREFERRED EMBODIMENTS

The method that is the subject of the invention, according to the preferred embodiment described herein, makes it possible to regulate the power delivered by a reciprocating four-stroke engine, preferably of the single-cylinder type, in response to an anomalous event occurring while a two- or four-wheel vehicle is running.

According to an alternative embodiment of the method of the invention, the engine to which the above mentioned method is applied may also be a two-stroke engine.

It cannot be excluded that in different embodiments said two-stroke or four-stroke engine may comprise more than one cylinder, meaning that it may be a multi-cylinder engine, as it is called in technical jargon.

The term anomalous events means, as already explained, all those situations in which the two or four wheels do not have optimal grip on the ground, for example in case of off-road or motocross use, when the wheels of a vehicle, especially the driving wheels, slip on the ground, or in all the situations in which during a turn the rear wheel/wheels tends/tend to skid and, finally, even when one or more wheels are lifted from the ground and tend to turn idly, as is the case when the rider makes a jump with his/her vehicle during a motocross competition.

Furthermore, before starting to describe the method of the invention in its preferred embodiment and its variants, it is important to underline that from this point on the term "engine cycle", referring to a four-stroke engine, means the repetition for two consecutive times of the crankshaft revolution, and thus of the alternate movement of the piston, so that the intake and compression strokes (making up the so-called "first revolution" of the cycle), and the ignition and expansion strokes (making up the so-called "second revolution" of the cycle) are carried out consecutively.

On the other side, for a two-stroke engine the term "engine cycle" means a single revolution of the crankshaft and thus a single cycle of the alternate movement of the piston, even in this case in order to carry out the four intake, compression, ignition and expansion strokes consecutively.

Furthermore, the term "angular position of the crankshaft during a given stroke" means any position assumed by the crankshaft during a specific engine stroke, for example during the intake stroke.

Finally, it is also important to point out that the method of the invention is based on the principle according to which, when one of the anomalous situations described above occurs, the number of engine rpm between one cycle and the immediately successive ones varies quickly and in an anomalous way. Said variation results to be substantially proportional to the extent of the anomalous event.

The above premises having been considered, according to the preferred embodiment of the method of the invention, on ignition of the engine the method defines and sets the values of a constant time interval T1, of an upper threshold 101 for the number of engine rpm and an upper threshold 102 for the percentage opening of the engine's throttle valve. Said thresholds are in turn used by the method of the invention to define an operating area 100 in the Cartesian graph by whose axes represent the value of the engine rpm and of the percentage opening of said throttle valve TPS.

Figure 4:
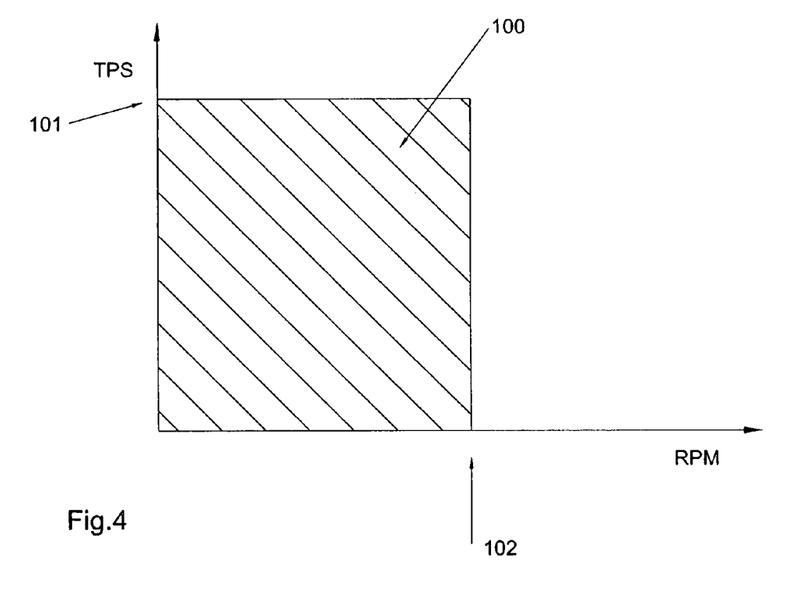
FIG. 4 shows the Cartesian graph by in which the operating area is defined according to the preferred embodiment of the invention.

In particular, said operating area 100 is delimited at the top by said two upper thresholds 101 and 102, as shown in FIG. 4.

The value of the time interval T1 is selected based on the anomalous event to be detected. In particular, as already explained, if the anomalous event to be detected is the slipping of a vehicle's wheels, suitable values of T1 are preferably included between 2 and 250 ms.

The value of the upper thresholds 101 and 102 is decided based on design needs.

Figure 5:
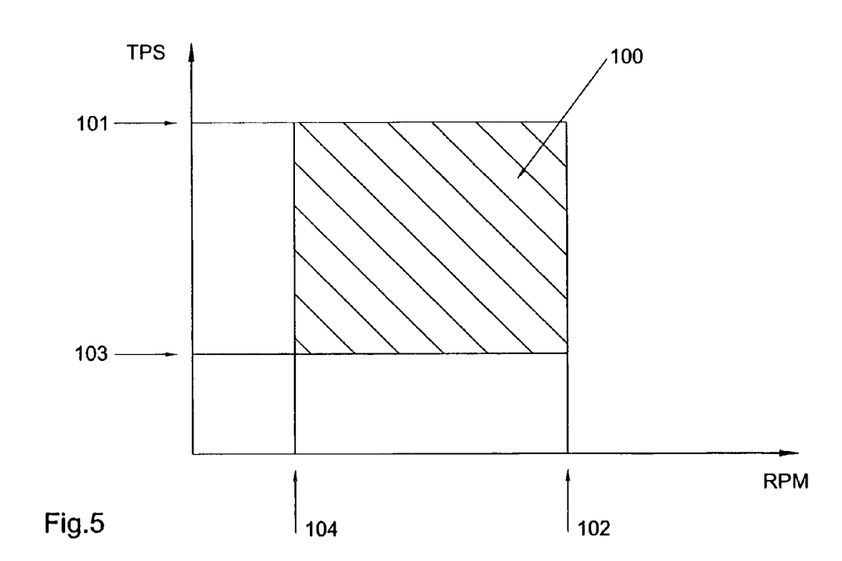
FIG. 5 shows the Cartesian graph by in which the operating area is defined according to an alternative embodiment of the invention.

According to an alternative embodiment of the method of the invention, it cannot be excluded that it may be possible to define two engine rpm thresholds, an upper threshold 101 and a lower threshold 103, and two thresholds for the percentage opening of the throttle valve, an upper threshold 102 and a lower threshold 104, between which said operating area 100 is defined, as shown in FIG. 5.

Furthermore, different embodiments of the invention may combine in an optimal manner the various thresholds described above.

Finally, according to the preferred embodiment of the method of the invention, said method defines the value of a zeroing time interval T2, whose function will be explained below.

Figure 1:
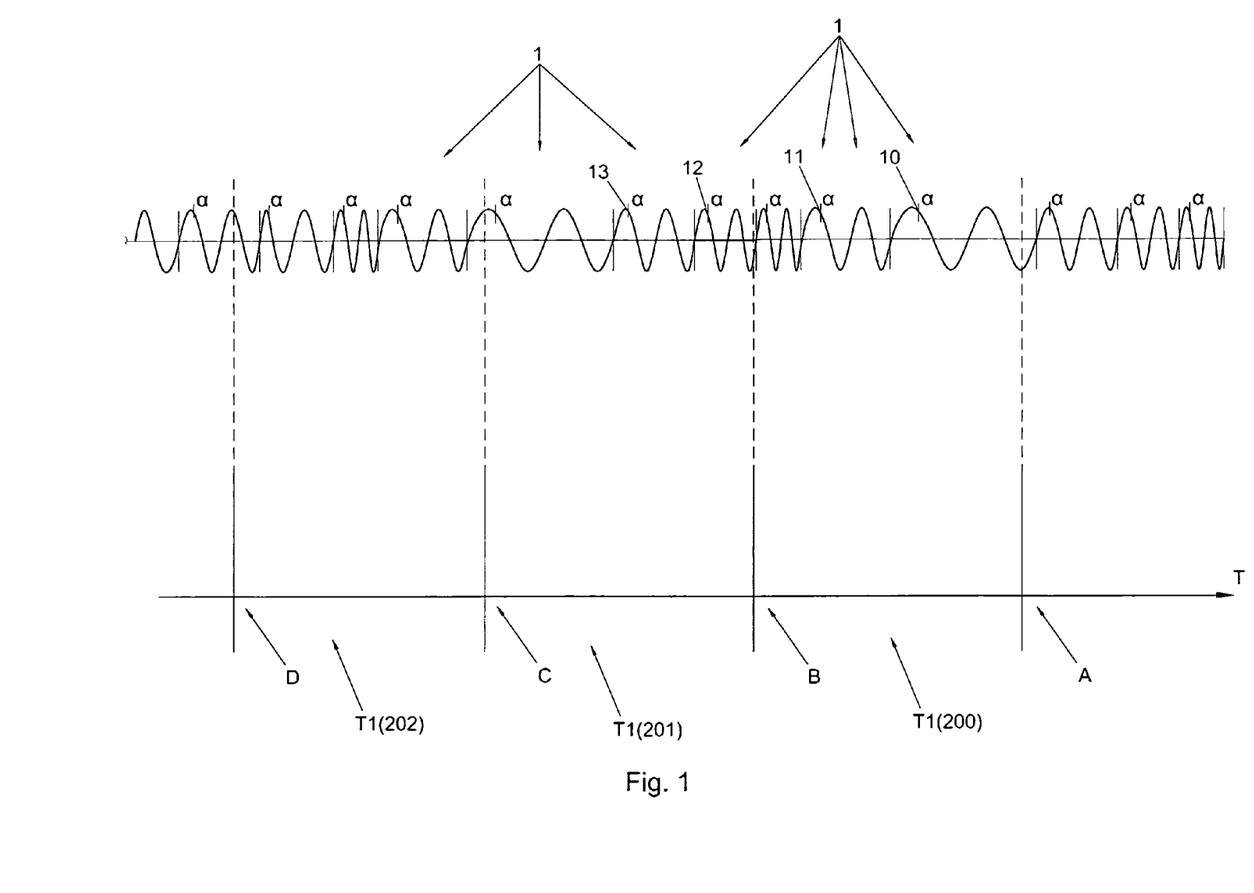
FIG. 1 illustrates, along the time line t, the execution of the stages of the method of the invention according to its preferred embodiment; in particular, it shows a plurality of engine cycles of a four-stroke engine and a plurality of consecutive time intervals T1.

Once said values have been determined and set, in its first operating stage a) said method measures, for each engine cycle 1, the value of the engine rpm, some of which are indicated in FIG. 1 by 10, 11, 12 and 13 at the level of a predefined angular position α of the crankshaft in a specific stroke of each engine cycle 1.

The angular position α remains the same for all the engine cycles 1.

Figure 2:
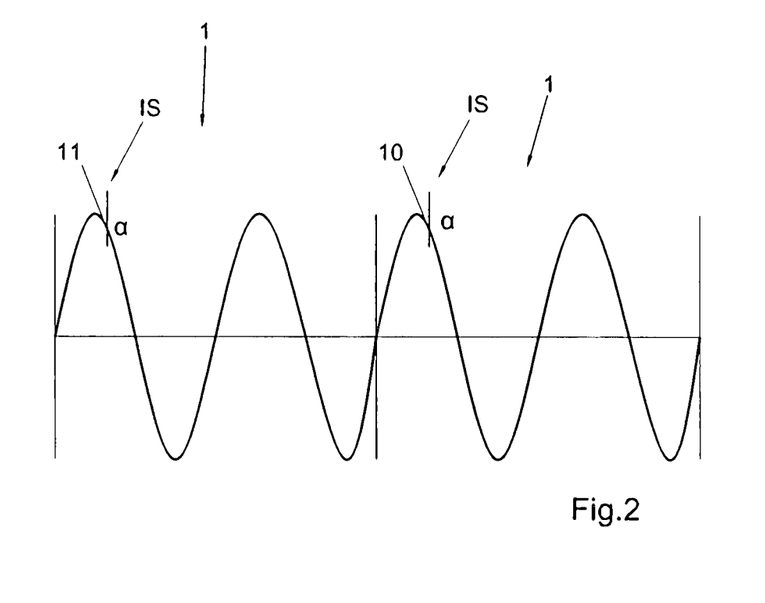
FIG. 2 schematically shows the angular position α, at the start of the intake stroke for two consecutive engine cycles of a four-stroke engine; in said angular position α the two measurements of the value of the engine rpm are carried out according to the preferred embodiment of the invention.

In particular, according to the preferred embodiment of the invention, each RPM measurement 10, 11, 12 and 13 is carried out at the level of the angular position α of the crankshaft that coincides exactly with the start of the intake stroke, indicated by IS in FIG. 2, of the engine cycle 1.

Figure 3:
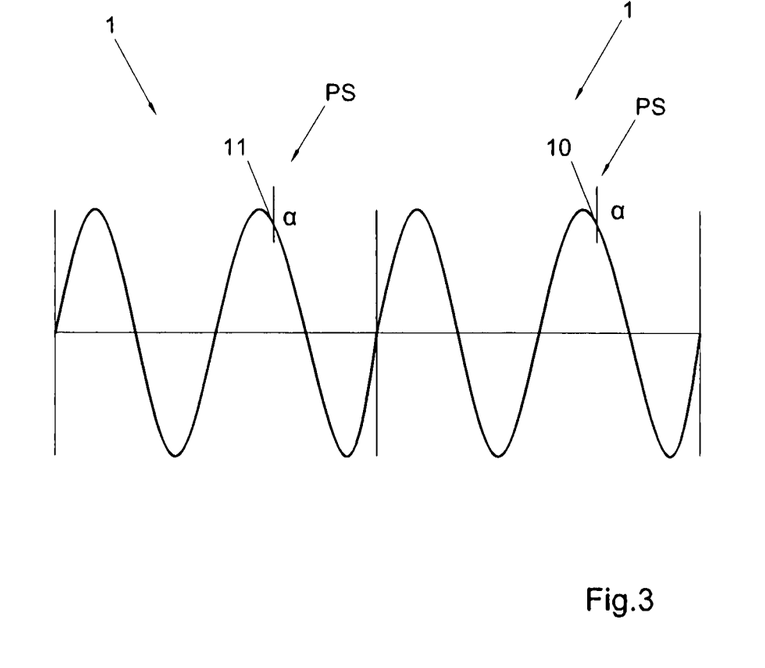
FIG. 3 schematically shows the angular position α, at the start of the expansion stroke for two consecutive engine cycles of a four-stroke engine; in this angular position α the two measurements of the value of the engine rpm are carried out according to an alternative embodiment to the one shown in FIG. 3.

However, in an alternative embodiment of the invention it cannot be excluded that each one of said RPM measurements 10, 11, 12 and 13 may be carried out at the height of the angular position α of the crankshaft coinciding with the start of the expansion stroke or power stroke PS of each engine cycle 1, as schematically shown in FIG. 3.

Furthermore, in alternative embodiments of the invention it cannot be excluded that each one of said RPM measurements of the value of the engine rpm takes place in any angular position α of the crankshaft in a specific stroke of the engine cycle 1.

In the second stage b) of the method of the invention, which is parallel to and independent of the first stage a), during the operation of the engine, an activation value X* is calculated at the final instant A of each time interval T1 200 belonging to a plurality of consecutive time intervals T1, as schematically shown in FIG. 1.

In the preferred embodiment of the invention said activation value is obtained by calculating the difference ΔX between the values Xn(A) and Xn(B). Said values Xn(A) and Xn(B) are in turn respectively obtained, as regards the value Xn(A), by calculating the difference between the last RPM value 10, measured before the final instant A of the reference time interval T1 200 and the RPM value 11 that precedes it, and, as regards the value Xn(B), by calculating the difference between the last RPM value 12, measured before the initial instant B, always of the reference time interval T1 200, and the RPM value 13 that precedes it.

In other words, the values Xn(A) and Xn(B) both represent the variation of the number of engine rpm between two consecutive engine cycles 1.

However, it cannot be excluded that in different embodiments, not described herein, the activation value X* be obtained by comparing in alternative manners the above mentioned last RPM value 10, measured before the final instant A, and the last RPM value 12, measured before the initial instant B of the time interval T1 200.

For example, said comparison may include the direct calculation of the difference ΔX between the last RPM value 10 and the last RPM value 12.

Going back to the preferred embodiment of the invention, to obtain the activation value X* the difference ΔX is multiplied by a predefined normalization coefficient Kp.

Said operation advantageously makes it possible to normalize the activation value X* within a value interval defined between zero and a predefined positive integer m.

Said value interval preferably but not necessarily comprises the values from 0 to 15.

Furthermore, according to the preferred embodiment, the above mentioned difference ΔX, multiplied by the normalization coefficient Kp, is added to a derivative factor ΔX*×Kd.

In particular, said factor ΔX* is obtained from the difference between the activation values X* calculated at the final instants B and C, shown in FIG. 1, relevant to the two time intervals T1 201 and 202 that precede the reference time interval T1 200. The coefficient Kd corresponds to a predefined derivative coefficient.

Thus, according to the preferred embodiment of the invention, the activation value X* is calculated with the following formula:

$$X^* = Kp \times \Delta X + Kd \times \Delta X^* \text{ with } 0 >= X^* >= m$$

where $$\Delta X = Xn(A) - Xn(B)$$

and $$\Delta X^* = X^*(B) - X^*(C).$$

In particular, the greater the extent of the anomalous event, the higher the is activation value X* within the pre-established interval and, on the contrary, the smaller the extent of the anomalous event, the more the activation value X* approaches zero.

Once the activation value X* has been calculated, according to the technique of the preferred embodiment described up to now, or according to an alternative embodiment, the method carries out, at the same final instant A of the reference time interval T1 200, the verification stages c) and d), and if necessary the activation stage of the engine power reduction e).

In particular, in the stage c) the method verifies whether said activation value X* differs from zero and, if so, in which position of said value interval it is situated.

Successively, the method of the invention, if said activation value X* differs from zero, verifies, through stage d) whether the last value of engine RPM 10 and the last value of the percentage opening of the throttle valve TPS measured before the final instant A fall within the operating area 100 previously defined.

If the activation value X* differs from zero and said values of the engine RPM 10 and of the throttle valve TPS are within the operating area 100, the method of the invention activates the reduction of the engine power by a percentage value P(X*) that is directly proportional to the activation value X*.

In fact, each value within said predefined interval is associated with an engine power reduction value P expressed as a percentage.

The higher the activation value X*, the higher the percentage P associated with it. Thus, the higher the value X*, the more the engine power will be reduced. However, said engine power reduction is not performed if at least one of said checks, according to stages c) and d), gives a negative outcome.

In this regard, the preferred embodiment of the invention comprises a further stage, indicated by f), in which, if at least one of the two RPM 10 and TPS values measured during the last engine cycle 1 before the final instant A is outside the operating area 100, the engine power reduction, if active, is to interrupted by reducing the activation value X* until zeroing it for the entire predefined time interval T2.

Consequently, the reduction percentage P(X*) fixed for the engine power is progressively reduced in proportion to the reduction of said activation value X*. As described in depth above, if the engine power reduction is active, said further stage f) avoids supplying instantaneously all the power required, for example, by a rider who is accelerating.

In the preferred embodiment of the invention, said engine power reduction is obtained by reducing the spark energy of the engine sparking plug by a pre-established quantity that is defined, in fact, based on the value determined for the activation value X*. The higher and further from zero the activation value X*, the more necessary it is to reduce the engine power and, consequently, the more the spark energy is reduced.

However, in an alternative embodiment, it cannot be excluded that the engine power reduction can be obtained by reducing the spark advance of the engine itself, also in this case by a pre-established quantity according to the activation value X*.

Still alternatively, the engine power reduction may be obtained by varying the fuel-comburant ratio; this variation, as in the previous cases, depends on the activation value X* within the pre-established interval.

Furthermore, it cannot be excluded that, in different embodiments of the method of the invention, the engine power reduction, based on the activation value X*, is obtained by combining in an optimal manner the techniques described above, for example by combining the spark energy reduction with the spark advance reduction.

In addition to the method described above, the object of the present invention includes also a computer program that can be directly loaded in the memory of an electronic processing device.

Said computer program comprises a portion of software code capable of implementing the stages of the method of the invention, in its preferred embodiment and also in all the other alternative embodiments, when the same computer program is executed in said electronic processing device.

Furthermore, the invention also concerns an electronic unit for cars but mainly for motorcycles, comprising a memory in which said computer program is loaded, and a microprocessor capable of executing the instructions regarding the portion of software code of the computer program and thus of performing the various stages of the method of the invention.

Advantageously, said electronic unit of the invention, as already explained, must be connected as an input only to sensor devices already present in the engine of motorcycles or cars that make it possible to measure the number of engine rpm and, if necessary, the position of the throttle valve.

This means that there is no need to install and connect other dedicated sensor devices to the electronic unit of the invention, differently from what happens in the traction control units of the known art.

The above clearly shows that the method of the invention for regulating the power delivered by an engine, the computer program and the electronic unit of the invention achieve all the set objects.

In particular, the present invention achieves the object to provide a method for regulating the power delivered by an engine in response to an anomalous event, suited to manage monitoring of anomalous situations and to decide if it is necessary to intervene or not according to data and information already available in the present engines, as the number of engine rpm and the position of the throttle valve.

Consequently, the present invention achieves the further object to provide an electronic processing device, in particular an electronic unit preferably for motorcycles, suited to manage the process for regulating the power delivered by the engine, including as an input data and information already available and used for other types of control performed on the same vehicle.

Thus, the electronic unit of the invention carries out a check in a completely different manner compared to the electronic units of the known art that require, as already explained, specific information regarding the rotation of the wheels obtainable through sensor devices arranged and installed on the wheels for said purpose.

The present invention also achieves the object to provide a method for regulating the engine power that in addition to verifying and minimizing, if not even eliminating, anomalous situations occurring while a vehicle is running, can gradually adapt also to the rider's driving needs.

On implementation, the method, the computer program and the electronic unit that are the subjects of the invention may undergo changes that, though not illustrated or described herein, shall nonetheless be covered by the present patent, provided that they come within the scope of the claims that follow.

The invention claimed is:

1. A method for regulating the power delivered by a reciprocating engine comprising:
   defining a value of a constant time interval T1;
   defining values of an upper threshold for the engine RPM and an upper threshold for a percentage opening of a throttle valve of said engine;
   measuring for each engine cycle, during an operation period of said engine, a value of the engine RPM at a predefined angular position of a crankshaft of the engine in a specific stroke of said engine cycle, said angular position being constant for all engine cycles;
   measuring for each of a plurality of consecutive time intervals T1 that are measured during the operation period of the engine, a percentage opening of said throttle valve value $TPS_n$;
   calculating, during the operation period of the engine, at the final instant of each of the plurality of consecutive time intervals T1, an activation value X*, the activation value being the difference between a last engine RPM value $X_n$ measured during the current time interval $T1_n$ and a last engine RPM value $X_{n-1}$ measured during an immediately previous time interval $T1_{n-1}$;
   checking at the final instant of each of the plurality of consecutive time intervals T1, if the calculated activation value X* differs from zero;
   if a checked activation value X* differs from zero for a given time interval T1, verifying at the final instant of the given time interval T1 if the last measured engine RPM value $X_n$ and the last measured percentage opening of said throttle valve value $TPS_n$ for the given time interval T1 fall below said upper thresholds;
   if the checked activation value X* for the given time interval T1 differs from zero and is positive and the last measured RPM value $X_n$ and the last measured percentage opening of said throttle valve value $TPS_n$ for the given time interval T1 fall below said upper thresholds, reducing the engine power by a percentage value P(X*) that is directly proportional to said activation value X*.

2. The method according to claim 1, wherein said calculation includes a calculation of difference ΔX between said last RPM value $X_n$ and said last RPM value $X_{n-1}$.

3. The method according to claim 1, wherein said calculation includes calculating the difference ΔX between values Xn(A) and Xn(B), Xn(A) being the difference between said last RPM value $X_n$ and an RPM value that precedes it in the same time interval $T1_{n-1}$, said value Xn(B) being the difference between said last RPM value $X_{n-1}$ and the RPM value that precedes it in the previous time interval $T1_{n-1}$.

4. The method according to claim 2, wherein said activation value X* is obtained by multiplying said difference ΔX by a predefined normalization coefficient Kp so that said activation value $X^*$ assumes a value within a value interval defined between zero and m, m being a positive natural number.

5. The method according to claim 3, wherein said activation value $X^*$ is obtained by multiplying said difference $\Delta X$ by a predefined normalization coefficient Kp so that said activation value $X^*$ assumes a value within a value interval defined between zero and m, m being a positive natural number.

6. The method according to claim 2, wherein said activation value $X^*$ is obtained by adding a derivative factor $\Delta X^* \times Kd$ to said difference $\Delta X$, $\Delta X^*$ being the difference between two activation values $X^*_{n-1}$ and $X^*_{n-2}$ calculated at the end of two time intervals $T1_{n-1}$ and $T1_{n-2}$, respectively, said time intervals $T1_{n-1}$ and $T1_{n-2}$ preceding the current time interval $T1_n$, Kd being a predefined derivative coefficient.

7. The method according to claim 3, wherein said activation value $X^*$ is obtained by adding a derivative factor $\Delta X^* \times Kd$ to said difference $\Delta X$, $\Delta X^*$ being the difference between two activation values $X^*_{n-1}$ and $X^*_{n-2}$ calculated at the end of two time intervals $T1_{n-1}$ and $T1_{n-2}$, respectively, said time intervals $T1_{n-1}$ and $T1_{n-2}$ preceding the current time interval $T1_n$, Kd being a predefined derivative coefficient.

8. The method according to claim 1, further comprising:
defining a value of a zeroing time interval T2;
if the last RPM value $X_n$ or the last percentage opening of said throttle valve value $TPS_n$ fall above said upper thresholds, continuously reducing said activation value $X^*$ until zeroing it during the entire time interval T2 and reducing said percentage value $P(X^*)$ in proportion to said reduction of said activation value $X^*$.

9. The method according to claim 1, wherein said value of said time interval T1 is defined between 2 and 250 ms.

10. The method according to claim 1, wherein said engine power is reduced by reducing a spark energy of one or more spark plugs of said engine.

11. The method according to claim 1, wherein said engine power is reduced by reducing a spark advance of said engine.

12. The method according to claim 1, wherein said engine power is reduced by varying a fuel-oxidant ratio of said engine.

13. The method according to claim 1, wherein said reciprocating engine is a four-stroke engine with at least one cylinder.

14. The method according to claim 1, wherein said reciprocating engine is a two-stroke engine with at least one cylinder.

15. A computer program product, comprising a non-transitory computer-readable medium having a computer-readable program code embodied thereon, the computer-readable program code adapted to be executed by an electronic processing device to perform a method for regulating the power delivered by a reciprocating engine, the method comprising:
defining a value of a constant time interval T1;
defining values of an upper threshold for the engine RPM and an upper threshold for a percentage opening of a throttle valve of said engine;
measuring, for each engine cycle, during an operation period of said engine, a value of the engine RPM at a predefined angular position of a crankshaft of the engine in a specific stroke of said engine cycle, said angular position being constant for all engine cycles;
measuring for each of a plurality of consecutive time intervals T1 that are measured during the operation period of the engine, a percentage opening of said throttle valve value $TPS_n$;
calculating, during the operation period of the engine, at the final instant of each of the plurality of consecutive time intervals T1, an activation value $X^*$, the activation value being the difference between a last engine RPM value $X_n$ measured during the current time interval $T1_n$ and a last engine RPM value $X_{n-1}$ measured during an immediately previous time interval $T1_{n-1}$;
checking at the final instant of each of the plurality of consecutive time intervals T1, if the calculated activation value $X^*$ differs from zero;
if a checked activation value $X^*$ differs from zero for a given time interval T1, verifying at the final instant of the given time interval T1 if the last measured engine RPM value $X_n$ and the last measured percentage opening of said throttle valve value $TPS_n$ for the given time interval T1 fall below said upper thresholds;
if the checked activation value $X^*$ for the given time interval T1 differs from zero and is positive and the last measured RPM value $X_n$ and the last measured percentage opening of said throttle valve value $TPS_n$ for the given time interval T1 fall below said upper thresholds, reducing the engine power by a percentage value $P(X^*)$ that is directly proportional to said activation value $X^*$.

16. An electronic unit for cars and/or motorcycles, comprising:
the computer program product according to claim 15; and
a microprocessor that executes the computer-readable program code of the computer program product.

* * * * *